(12) United States Patent
Hu et al.

(10) Patent No.: US 12,565,007 B2
(45) Date of Patent: Mar. 3, 2026

(54) AIRY BEAM-ENABLED BINARY ACOUSTIC METASURFACES FOR UNDERWATER ULTRASOUND BEAM MANIPULATION

(71) Applicant: Washington University, St. Louis, MO (US)

(72) Inventors: Zhongtao Hu, St. Louis, MO (US); Hong Chen, St. Louis, MO (US)

(73) Assignee: Washington University, St. Louis, MO (US)

( * ) Notice: Subject to any disclaimer, the term of this patent is extended or adjusted under 35 U.S.C. 154(b) by 424 days.

(21) Appl. No.: 18/352,700

(22) Filed: Jul. 14, 2023

(65) Prior Publication Data

US 2024/0019562 A1     Jan. 18, 2024

Related U.S. Application Data

(60) Provisional application No. 63/368,437, filed on Jul. 14, 2022.

(51) Int. Cl.
*B33Y 50/02*          (2015.01)
*B29C 64/386*          (2017.01)
(Continued)

(52) U.S. Cl.
CPC ............ *B29C 64/386* (2017.08); *B33Y 50/00* (2014.12); *B29K 2067/046* (2013.01); *B29K 2995/0001* (2013.01); *B33Y 70/00* (2014.12)

(58) Field of Classification Search
CPC ..................................................... B33Y 50/00
See application file for complete search history.

(56) References Cited

U.S. PATENT DOCUMENTS

2017/0038574 A1*  2/2017  Zhuang .............. G01N 21/6458
2017/0261538 A1    9/2017  Kamilov et al.
(Continued)

FOREIGN PATENT DOCUMENTS

CN     103996395 A      8/2014
CN     104765153 A  *  7/2015  ............. G02B 27/30
(Continued)

OTHER PUBLICATIONS

Hu et al, Airy-Beam-Enabled Binary Acoustic Metasurfaces for underwater Ultrasound-Beam Manipulation, 2022, CHORUS, pp. 19 (Year: 2022).*
(Continued)

*Primary Examiner* — Suresh Suryawanshi
(74) *Attorney, Agent, or Firm* — Armstrong Teasdale LLP

(57) ABSTRACT

A method of fabricating a binary metasurface for producing an ultrasound Airy beam for underwater ultrasound applications is provided. The method includes generating an amplitude distribution of an Airy beam at a frequency, and converting the amplitude distribution into a binary phase profile. The method also includes generating a 3D printing design of a binary metasurface based on the binary phase profile, wherein the binary metasurface includes ridges and grooves defined by neighboring ridges, a ridge having a thickness corresponding to a phase delay of $\pi/2$ of the Airy beam between water and a 3D-printable material. The method further includes additively manufacturing the binary metasurface with the 3D-printable material based on the 3D printing design.

20 Claims, 14 Drawing Sheets
(9 of 14 Drawing Sheet(s) Filed in Color)

(51) Int. Cl.
  *B33Y 50/00*   (2015.01)
  *B29K 67/00*   (2006.01)
  *B33Y 70/00*   (2020.01)

(56)      References Cited

U.S. PATENT DOCUMENTS

| | | | |
|---|---|---|---|
| 2020/0284960 A1 | 9/2020 | Ellenbogen et al. | |
| 2021/0208312 A1* | 7/2021 | Zhang | C23C 16/405 |
| 2021/0262077 A1* | 8/2021 | Zhang | C23C 14/0036 |
| 2022/0081342 A1* | 3/2022 | Liu | C03B 33/04 |

FOREIGN PATENT DOCUMENTS

| | | | | |
|---|---|---|---|---|
| CN | 105304076 A | | 2/2016 | |
| CN | 108417195 A | | 8/2018 | |
| CN | 109196387 A | | 1/2019 | |
| CN | 106228971 B | | 7/2019 | |
| CN | 110148397 A | | 8/2019 | |
| CN | 110245413 A | | 9/2019 | |
| CN | 105845121 B | | 12/2019 | |
| CN | 110989180 A | * | 4/2020 | G02B 27/0012 |
| CN | 210403190 U | | 4/2020 | |
| CN | 109088601 B | | 5/2020 | |
| CN | 111128109 A | | 5/2020 | |
| CN | 111261135 A | | 6/2020 | |
| CN | 111338090 A | * | 6/2020 | G02B 27/0938 |
| CN | 111766647 A | | 10/2020 | |
| CN | 111933106 A | | 11/2020 | |
| CN | 112140535 A | | 12/2020 | |
| CN | 113193349 A | | 7/2021 | |
| CN | 113314091 A | | 8/2021 | |
| CN | 112244894 B | | 10/2021 | |
| CN | 113765595 A | | 12/2021 | |
| CN | 114035247 A | | 2/2022 | |
| CN | 114200551 A | | 3/2022 | |
| CN | 114550682 A | | 5/2022 | |
| WO | 2018118984 A1 | | 6/2018 | |
| WO | 2022083432 A1 | | 4/2022 | |
| WO | 2022104683 A1 | | 5/2022 | |
| WO | WO-2024256591 A1 | * | 12/2024 | B29C 64/124 |

OTHER PUBLICATIONS

Chen et al, Broadband Airy-like beams by coded acoustic metasurfaces, 2019, AP Publishing, pp. 5 (Year: 2019).*

Tang et al, The generation of acoustic Airy beam with selective band based on binary metasurfaces: Customized on demand, 2021, Applied Physics Letter, pp. 8 (Year: 2021).*

Jiang, Xue et al., "Ultrasonic sharp autofocusing with acoustic metasurface," Physical Review B, vol. 102, 2020; 8 pp.

Gardiner, Alicia et al., "Additive Manufacture of Small-Scale Metamaterial Structures for Acoustic and Ultrasonic Applications," Micromachines 2021, vol. 12, Issue 634; https://doi.org/10.3390/mi2060634; 45 pp.

Fakheri, Mohammad et al., "Spatiotemporal Binary Acoustic Metasurfaces," Physical Review Applied, vol. 16, Issue 2, Aug. 2021; 14 pp.

Xie, Boyang et al., "Coding Acoustic Metasurfaces," Advanced Materials vol. 29, Issue 6, Feb. 10, 2017; https://doi.org/10.1002/adma.201603507; 8 pp.

\* cited by examiner

150

PROVIDE A BINARY METASURFACE

152

COUPLE THE BINARY SURFACE WITH A TRANSDUCER

154

PRODUCE THE AIRY BEAMS

156

1

AIRY BEAM-ENABLED BINARY ACOUSTIC METASURFACES FOR UNDERWATER ULTRASOUND BEAM MANIPULATION

CROSS-REFERENCE TO RELATED APPLICATIONS

This patent application claims the benefit of U.S. Provisional Patent Application No. 63/368,437, filed on Jul. 14, 2022, titled "AIRY BEAM-ENABLED BINARY ACOUSTIC METASURFACES FOR UNDERWATER ULTRASOUND BEAM MANIPULATION," the entire content and disclosure of which is hereby incorporated herein by reference in its entirety.

STATEMENT REGARDING FEDERALLY SPONSORED RESEARCH & DEVELOPMENT

This invention was made with government support under MH126861, MH116981, EB030102, EB027223 awarded by the National Institutes of Health and N00014-19-1-2335 awarded by the Office of Naval Research. The government has certain rights in the invention.

BACKGROUND

The field of the disclosure relates generally to systems and methods of ultrasound applications, and more particularly, to systems and methods for using Airy beams in underwater ultrasound applications.

An Airy beam is non-diffracting, where the beam propagates for a long distance without significantly extending the width of the beam. An Airy beam is also self-accelerating, where the beam may autofocus at a point. Further, an Airy beam is self-healing, where the beam reconstitutes itself and continues with the trajectory even after the beam is severely perturbed. However, underwater ultrasound applications of Airy beam is limited. Known systems and methods are disadvantaged in some aspects and improvements are desired.

BRIEF DESCRIPTION

In one aspect, a method of fabricating a binary metasurface for producing an ultrasound Airy beam for underwater ultrasound applications is provided. The method includes generating an amplitude distribution of an Airy beam at a frequency, and converting the amplitude distribution into a binary phase profile. The method also includes generating a 3D printing design of a binary metasurface based on the binary phase profile. The binary metasurface includes ridges and grooves defined by neighboring ridges, a ridge having a thickness corresponding to a phase delay of π/2 of the Airy beam between water and a 3D-printable material. The method further includes additively manufacturing the binary metasurface with the 3D-printable material based on the 3D printing design.

In another aspect, a method of producing an ultrasound Airy beam for underwater ultrasound applications is provided. The method includes providing a binary metasurface. The binary metasurface is fabricated by generating an amplitude distribution of an Airy beam at a frequency, and converting the amplitude distribution into a binary phase profile. The binary metasurface is fabricated further by generating a 3D printing design of the binary metasurface based on the binary phase profile. The binary metasurface includes ridges and grooves defined by neighboring ridges, a thickness of a ridge corresponding to a phase delay of π/2 of the Airy beam between water and a 3D-printable material. The binary metasurface is fabricated by additively manufacturing the binary metasurface with the 3D-printable material based on the 3D printing design. The method also includes coupling the binary metasurface with a transducer configured to emit an ultrasound wave at the frequency, and producing the Airy beam by projecting the ultrasound wave towards the binary metasurface.

In one more aspect, a binary metasurface for producing ultrasound Airy beams in underwater applications is provided. The binary metasurface includes ridges and grooves defined by neighboring ridges. The binary metasurface is additively manufactured with a 3D-printable material based on a 3D printing design corresponding to a binary phase profile, a thickness of a ridge corresponding to a phase delay of π/2 between water and the 3D-printable material of an Airy beam, and the binary phase profile is converted from an amplitude distribution of the Airy beam at the frequency.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

This disclosure includes metasurfaces and systems and methods for producing Airy beams and fabricating metasurfaces. Method aspects will be in part apparent and in part explicitly discussed in the following description.

Airy beams are beams that are non-diffracting, self-accelerating, and self-healing and provide great opportunities for ultrasound underwater applications. The ultrasound applications using Airy beams, however, are limited because of the lack of simply built device to generate Airy beams. In known methods, three-dimensional (3D) materials used in ultrasound wave manipulation are bulky and complex in design. Metasurfaces are alternatives to 3D materials. A metasurface is a sheet or a two-dimensional (2D) structure having a subwavelength thickness, where the thickness of the sheet is smaller than the wavelength of the waves for which the metasurface is designed. For example, if a metasurface is used for ultrasound applications, the ultrasound having a wavelength of 1 centimeter (cm), the metasurface has a thickness less than 1 cm. Known metasurfaces for generating Airy beams have two major drawbacks. The known metasurfaces are designed for airborne sound waves, which have relatively long wavelengths and require sub-wavelength units with complicated microstructures. Such metasurfaces for ultrasound applications are challenging to manufacture because the wavelength of ultrasound waves are in the millimeter scale. The other drawback of the known metasurfaces is that the known metasurfaces require relatively high acoustic impedance mismatch between air and the solid materials of the metasurfaces. The impedance difference between water and the solid materials does not meet the requirement. As a result, the known metasurfaces are not suitable for underwater applications.

In contrast, metasurfaces and systems and methods of fabricating metasurfaces and producing Airy beams described herein are suitable for underwater ultrasound applications. The methods of fabrication and production is simplified with a binary metasurface, which does not include complicated subwavelength microstructures. The binary metasurfaces are additively manufactured, which is advantageous in adjusting the binary metasurfaces to produce desired Airy beams. The generated Airy beams may be steered without replacement of the metasurface.

Figure 1A:
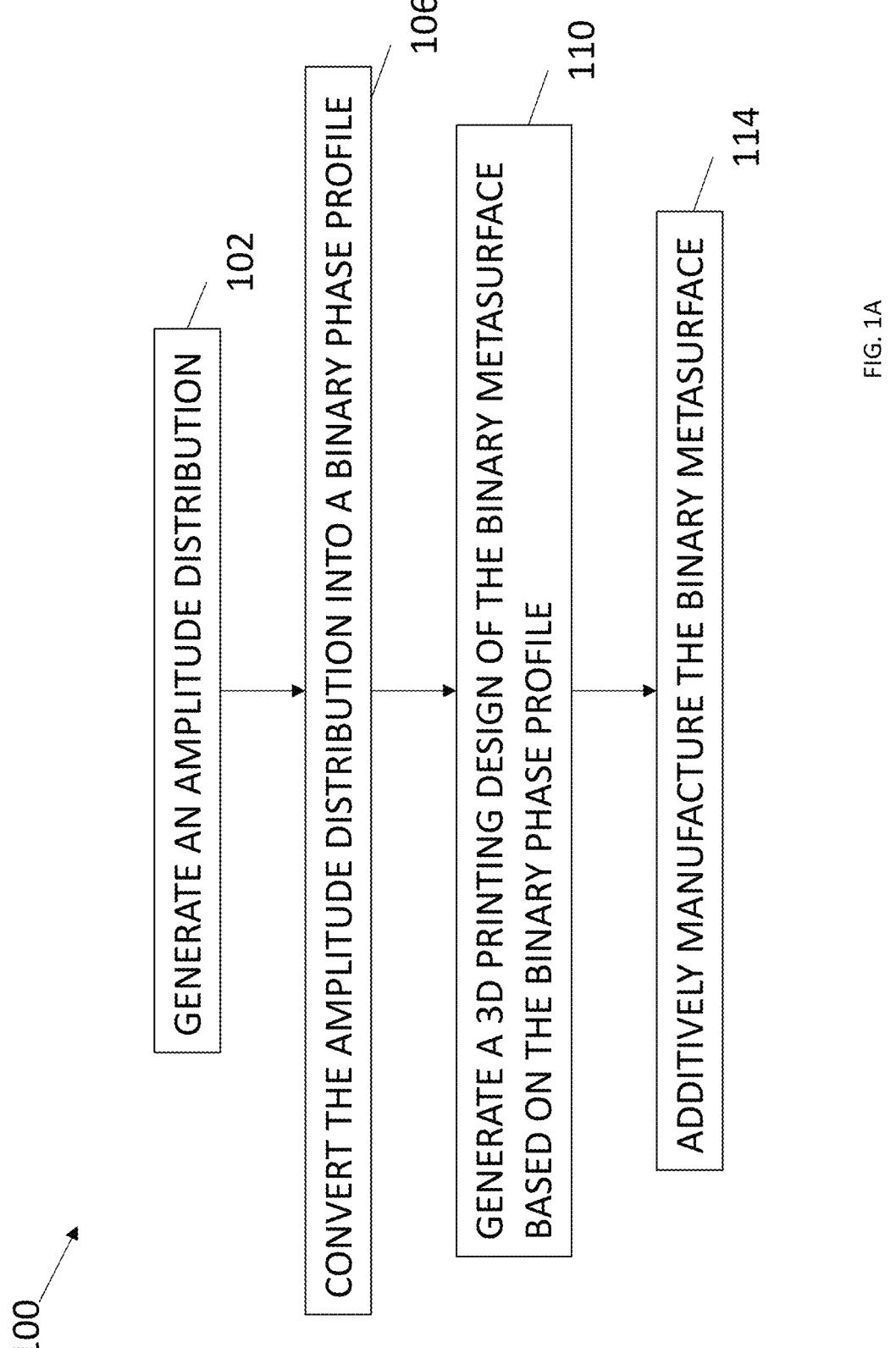
FIG. 1A is a flow chart of an example method of fabricating a binary metasurface.

FIGS. 1A-1D show example methods, systems, and binary metasurfaces. FIG. 1A is a flow chart of an example method 100 of fabricating a binary metasurface. In the example embodiment, method 100 includes generating 102 an amplitude distribution of an Airy beam (also see FIG. 4 described later). Amplitude distribution 404 is a plot of the amplitude of the Airy beam. Method 100 further includes converting 106 the amplitude distribution into a binary phase profile (also see FIG. 4). Phase profile 408 has two values. For example, if the amplitude at a location (x, y) in the amplitude distribution is greater than or equal to zero, a phase at the location (x, y) is set as $\pi/2$ or a bit of one "1," and if the amplitude at the location (x, y) is less than zero, the phase at the location (x, y) is set as zero. or a bit of zero "0."

Figure 4:
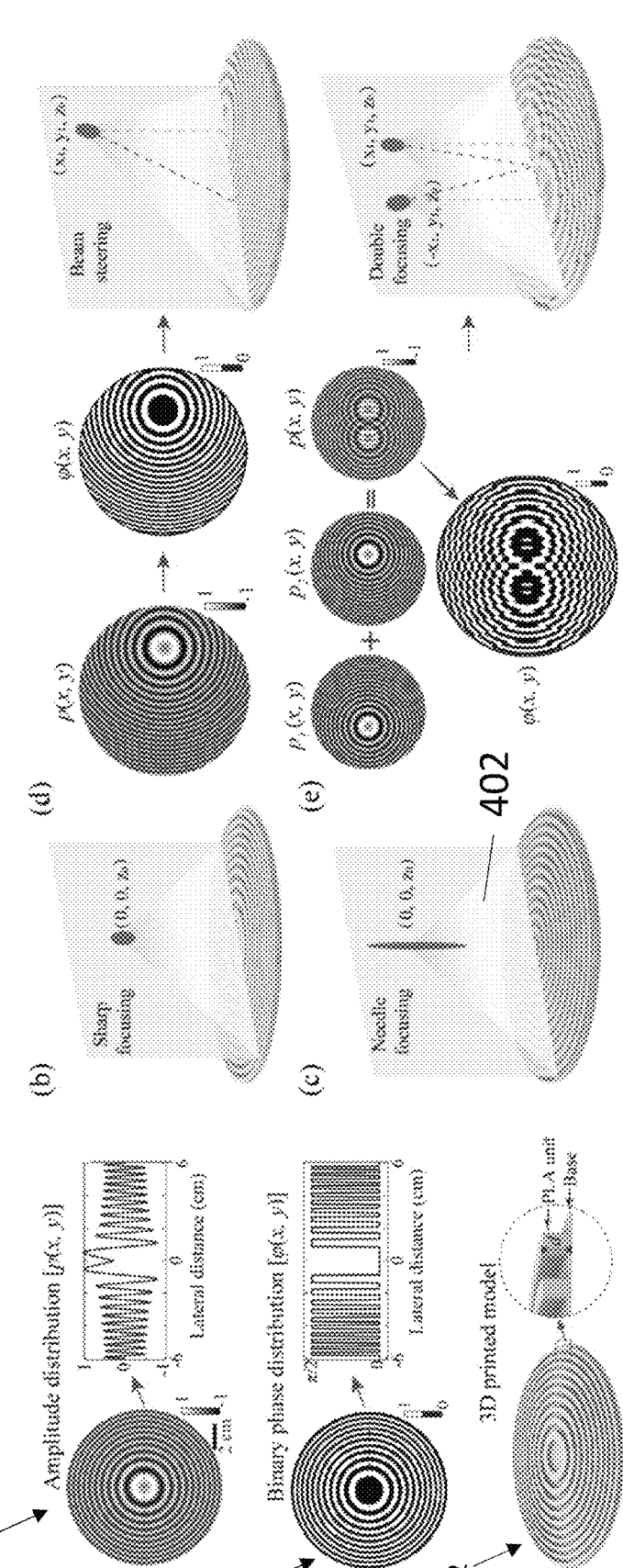
FIG. 4 shows design of 3D-printed Airy beam-enabled binary acoustic metasurfaces (AB-BAMs). (a) AB-BAM is designed based on the Airy beam amplitude distribution p(x,y) at the initial plane with the beam's cross-sectional line of the amplitude shown on the right side. The pressure distribution is converted into a binary phase profile φ(x,y) with the profile's cross-sectional line of the amplitude shown on the right side. The black and white circles represent units "1" and "0", respectively. The binary phase profile is then converted to a 3D model of an acoustic metasurface with the metasurface's thickness d chosen to generate a phase delay of π/2. The 3D model is made with a 3D printer using polylactic acid (PLA) filament. The AB-BAM may be designed to tune the focusing property. For example, the AB-BAM may generate a focused ultrasound beam with sharp focusing (b) and needle focusing (c). (d) Illustration of the AB-BAM designed for off-axis beam focusing. (e) Illustrations of AB-BAM designed for multi-point focusing. Superimposing the patterns of Airy beams focused at one point on the left [p₁(x,y)] and one point on the right [p₂(x,y)] to construct the amplitude distribution of double focusing [p(x,y)]. The amplitude profile is converted to a binary pattern φ(x,y) and 3D-printed to generate a double-focusing beam.

In the example embodiment, method 100 further includes generating 110 a 3D printing design of a binary metasurface based on the binary phase profile (also see FIG. 4). In the 3D printing design, a binary metasurface 112 includes ridges 182 and grooves 184. Grooves 184 are defined by neighboring ridges 182. A thickness d of ridge 182 is selected such that a phase delay of $\pi/2$ of the Airy beam between water and a 3D-printable material is produced. Thickness of ridge 182 is from a top surface 186 of ridge 182 to a bottom surface 188 of groove 184. When binary metasurface 112 is submerged in water, an Airy beam traveling in water has a phase difference of $\pi/2$ with the Airy beam traveling in the 3D printable material after traveling a distance of thickness d. A 3D printable material is a material that may be used in 3D printing or additive manufacturing. An example material is polylactic acid. In generating 110 a 3D printing design of binary metasurface 112 based on binary phase profile 408, ridges 182 may correspond to bits "1" and grooves 184 may correspond to bits "0." Method 100 also includes additively manufacturing 114 the binary metasurface with the 3D-printable material based on the 3D printing design.

Figure 1B:
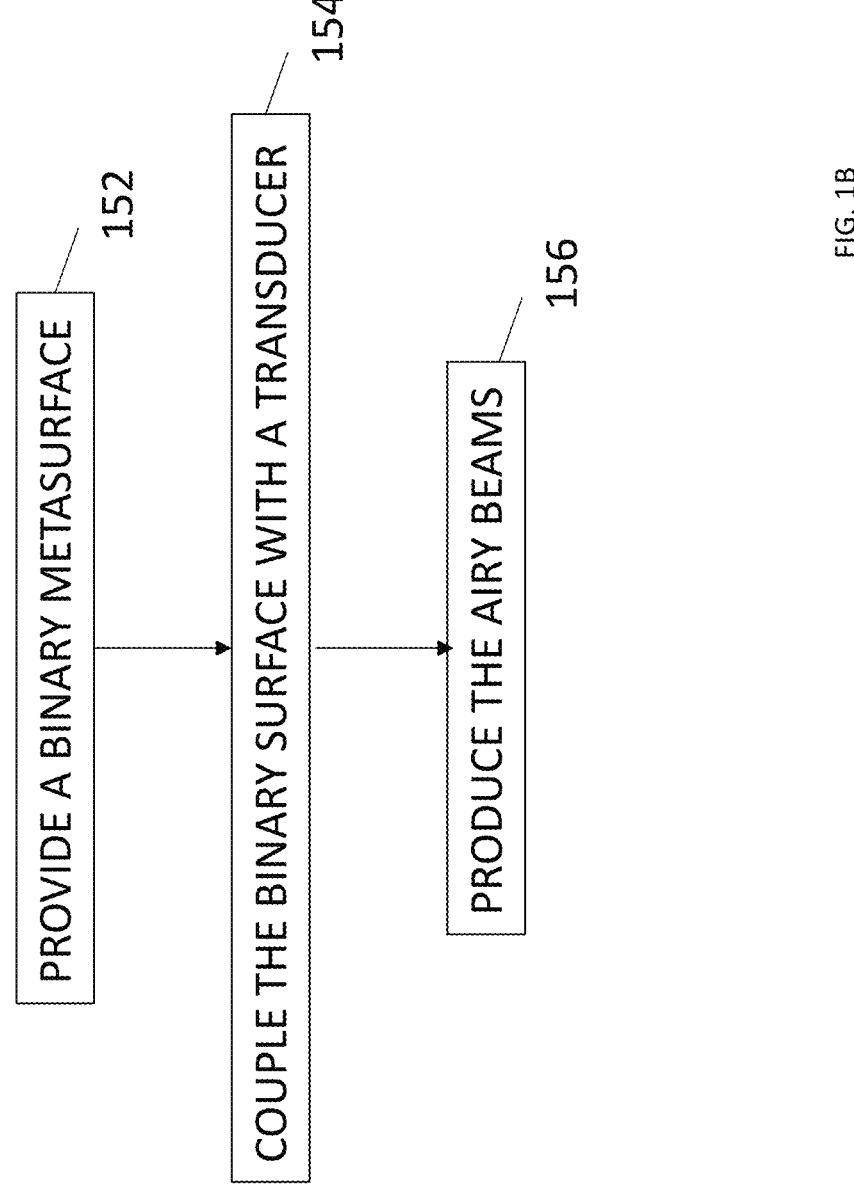
FIG. 1B is a flow chart of an example method of producing an Airy beam.

FIG. 1B is a flow chart of an example method 150 of producing Airy beams. In the example embodiment, Airy beams are produced using the binary metasurfaces. Method 150 includes providing 152 a binary metasurface. The binary metasurface is coupled 154 with a ultrasound transducer. Method 150 also includes producing 156 an Airy beam by projecting the ultrasound wave generated by the transducer towards the binary metasurface.

Figure 1C:
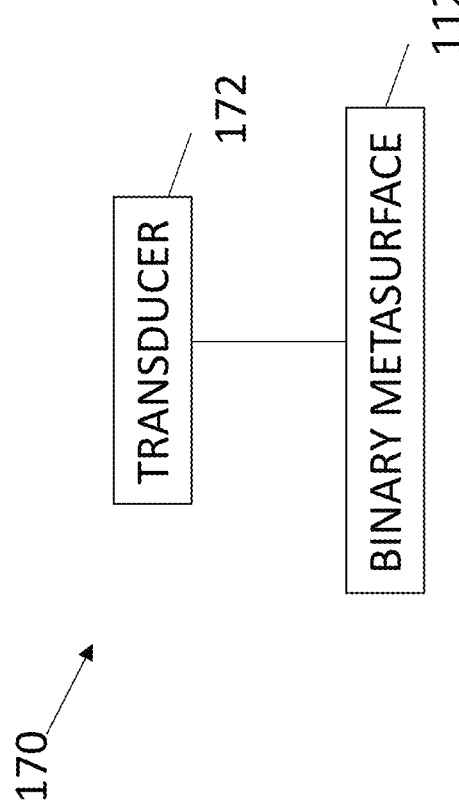
FIG. 1C is a block diagram of an example Airy beam production system.
Figure 1D:
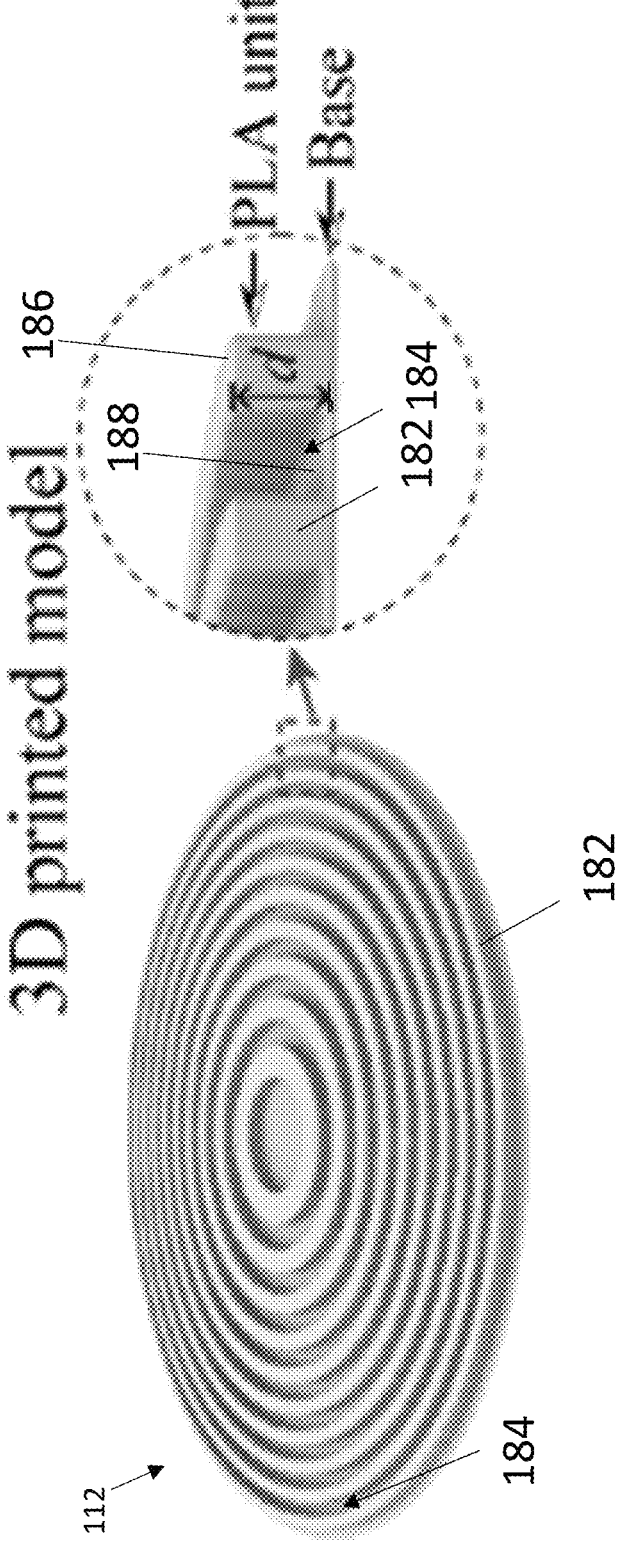
FIG. 1D shows an example binary metasurface.
Figure 2:
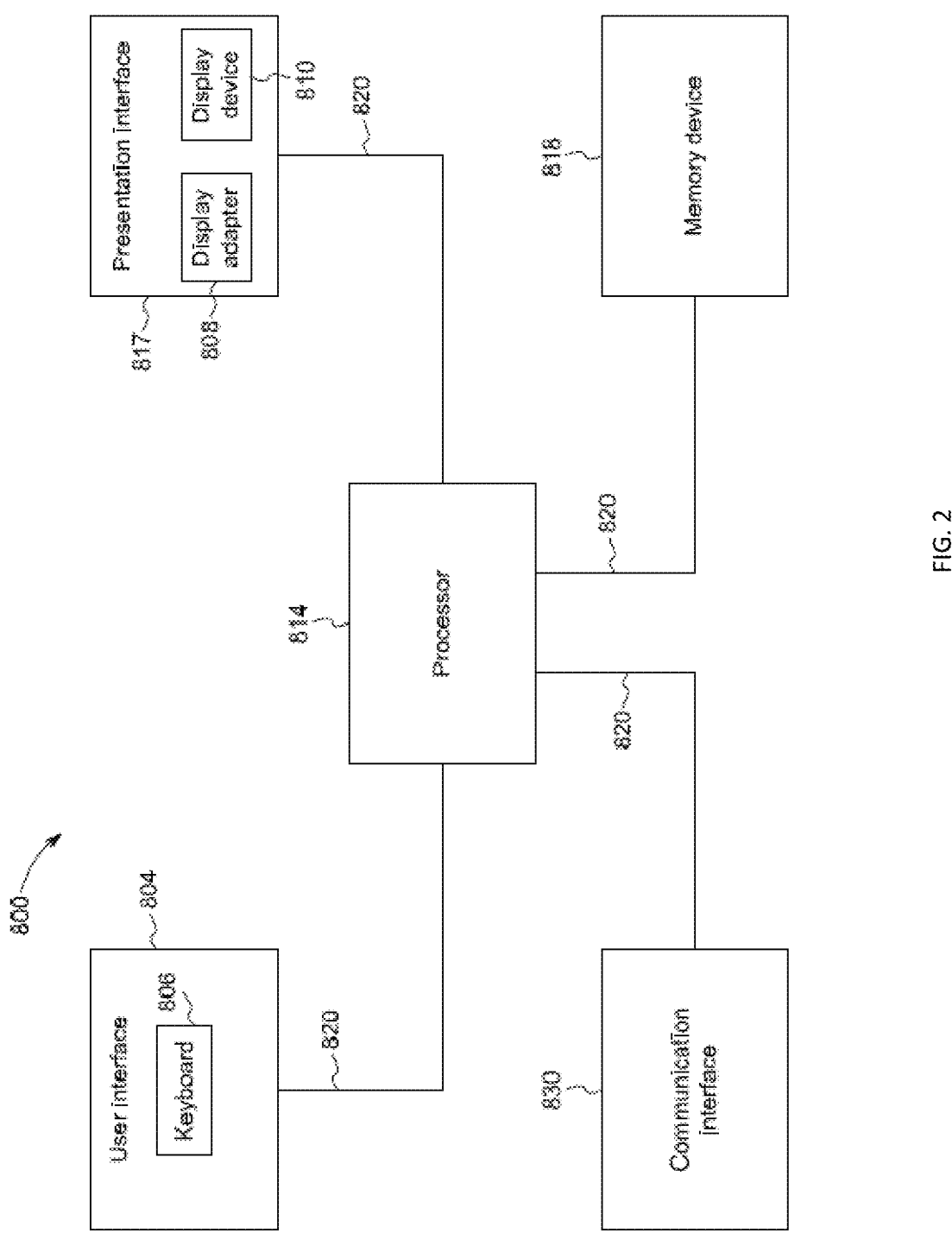
FIG. 2 is a block diagram of an example computing device.

FIG. 1C is a block diagram of an example Airy beam production system 170. FIG. 1D shows an example binary metasurface 112. In the example embodiment, Airy beam production system 170 includes a transducer 172 and binary metasurface 112. Transducer 172 is configured to generate ultrasound waves. Transducer 172 is coupled with binary metasurface 112 such that the ultrasound wave generated by transducer is projected toward binary metasurface 112 and reflected by binary metasurface 112, producing an Airy beam. Binary metasurface 112 functions as an acoustic lens to manipulate the Airy beam.

Because binary metasurfaces 112 are fabricated based on the amplitude distribution of a desired Airy beam 402, to produce desired Airy beam 402, a corresponding binary metasurfaces 112 may be fabricated by adjusting the parameters of Airy beam 402, such as a focal depth, a full length half maximum (FLHM), and a full width half maximum (FWHM). A focal depth or focal length in ultrasound is the distance from the transducer to the focal point or the focus of the beam. An FLHM is measured as the length of the main lobe of the beam at half maximum magnitude in the longitudinal direction or the travel direction of the beam. An FWHM is measured as the width of the main lobe at half maximum magnitude in the transverse direction.

Figure 3:
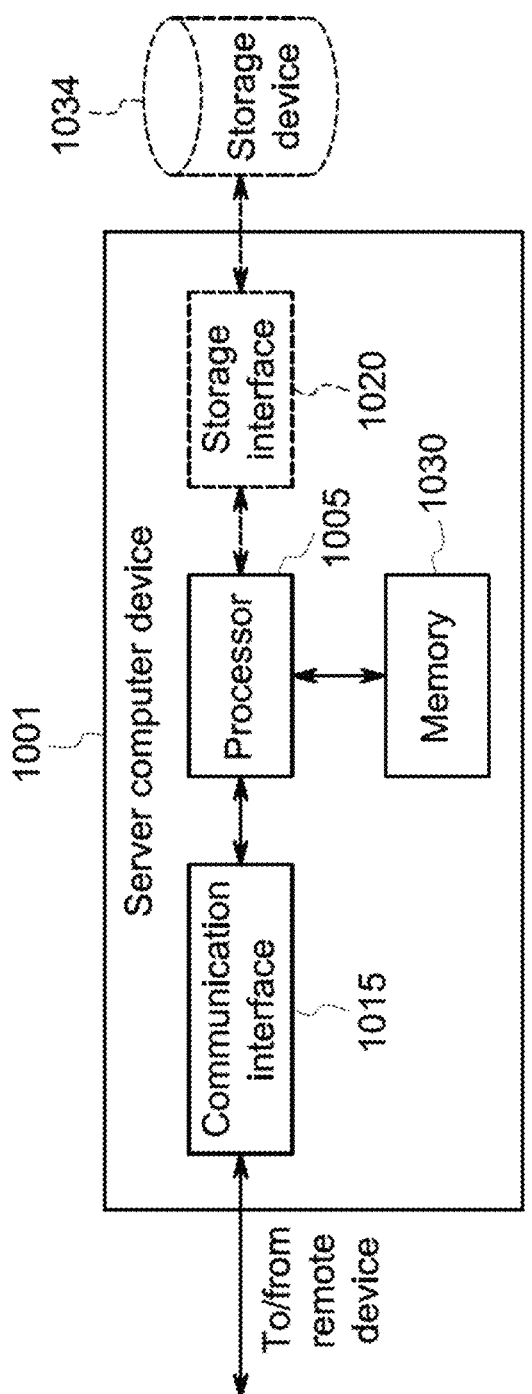
FIG. 3 is a block diagram of an example server computing device.

Methods 100 and 150 described herein or part of methods 100 and 150 may be implemented with any suitable computing device 800 and software implemented therein. FIG. 3 is a block diagram of an example computing device 800. In the example embodiment, computing device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the example embodiment, computing device 800 includes a presentation interface 817 that presents information, such as input events and/or validation results, to the user. Presentation interface 817 may also include a display adapter 808 that is coupled to at least one display device 810. More specifically, in the example embodiment, display device 810 may be a visual display device, such as a cathode ray tube (CRT), a liquid crystal display (LCD), a light-emitting diode (LED) display, and/or an "electronic ink" display. Alternatively, presentation interface 817 may include an audio output device (e.g., an audio adapter and/or a speaker) and/or a printer.

Computing device 800 also includes a processor 814 and a memory device 818. Processor 814 is coupled to user interface 804, presentation interface 817, and memory device 818 via a system bus 820. In the example embodiment, processor 814 communicates with the user, such as by prompting the user via presentation interface 817 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the example embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the example embodiment, memory device 818 stores, without limitation, application source code, application object code, configuration data, additional input events, application states, assertion statements, validation results, and/or any other type of data. Computing device 800, in the example embodiment, may also include a communication interface 830 that is coupled to processor 814 via system bus 820. Moreover, communication interface 830 is communicatively coupled to data acquisition devices.

In the example embodiment, processor 814 may be programmed by encoding an operation using one or more executable instructions and providing the executable instructions in memory device 818. In the example embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Methods 100 and 150 described herein or part of methods 100 and 150 may be implemented with a server computer device 1001. FIG. 4 illustrates an example configuration of a server computer device 1001. Server computer device 1001 also includes a processor 1005 for executing instructions. Instructions may be stored in a memory area 1030, for example. Processor 1005 may include one or more processing units (e.g., in a multi-core configuration).

Processor 1005 is operatively coupled to a communication interface 1015 such that server computer device 1001 is capable of communicating with a remote device or another server computer device 1001. For example, communication interface 1015 may receive data, via the Internet.

Processor 1005 may also be operatively coupled to a storage device 1034. Storage device 1034 is any computer-operated hardware suitable for storing and/or retrieving data. In some embodiments, storage device 1034 is integrated in server computer device 1001. For example, server computer device 1001 may include one or more hard disk drives as storage device 1034. In other embodiments, storage device 1034 is external to server computer device 1001 and may be accessed by a plurality of server computer devices 1001. For example, storage device 1034 may include multiple storage units such as hard disks and/or solid state disks in a redundant array of independent disks (RAID) configuration. storage device 1034 may include a storage area network (SAN) and/or a network attached storage (NAS) system.

In some embodiments, processor 1005 is operatively coupled to storage device 1034 via a storage interface 1020. Storage interface 1020 is any component capable of providing processor 1005 with access to storage device 1034. Storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1005 with access to storage device 1034.

EXAMPLE

Airy beams are peculiar beams that are non-diffracting, self-accelerating, and self-healing, and they have offered great opportunities for ultrasound beam manipulation. However, one critical barrier that limits the broad applications of Airy beams in ultrasound is the lack of simply built device to generate Airy beams in water. This work presents a family of Airy beam-enabled binary acoustic metasurfaces (AB-BAMs) to generate Airy beams for underwater ultrasound beam manipulation. AB-BAMs are designed and fabricated by 3D printing with two coding bits: a polylactic acid (an example 3D printing material) unit acting as a bit "1" and a water unit acting as a bit "0". The distribution of the binary units on the metasurface is determined by the pattern of Airy beam. To showcase the wavefront engineering capability of the AB-BAMs, several examples of AB-BAMs are designed, 3D printed, and coupled with a planar single-element ultrasound transducer for experimental validation. We demonstrate the capability of AB-BAMs in flexibly tuning the focal region size and beam focusing in 3D space by changing the design of the AB-BAMs. The focal depth of AB-BAMs may be continuous and electronical tuned by adjusting the operating frequency of the planar transducer without replacing the AB-BAMs. The superimposing method is leveraged to enable the generation of complex acoustic fields, e.g., multifoci and letter patterns (e.g., "W" and "U"). The more complex focal patterns are shown to be also continuously steerable by simply adjusting the operating frequency. Furthermore, the 3D-printed AB-BAMs are simple to design, easy to fabricate, and low-cost to produce with the capabilities to achieve tunable focal size, flexible 3D beam focusing, arbitrary multipoint focusing, and continuous steerability, which creates unprecedented potential for ultrasound beam manipulation.

I. INTRODUCTION

The concept of Airy beams originated from quantum mechanics in 1979. This concept was introduced into optics in 2007, and was later brought into acoustics in 2014. As a solution of the Schrödinger equation and paraxial wave equation, the Airy function gives rise to Airy beams that are non-diffracting, which means that beam may propagate for a long distance without significantly extending its width. Simultaneously, this beam laterally shifts in the transverse plane along a parabolic self-accelerating trajectory. When symmetric Airy beams are generated, these beams may autofocus at a point. Airy beams also exhibit self-healing properties in the sense that the beams reconstitute themselves and continue their trajectory even after the beam is severely perturbed. Because of these peculiar properties, Airy beams have attracted extensive attention in the past decade and have been applied in a wide range of areas, ranging from particle manipulation and trapping, laser filamentation, light-sheet microscopy, nonlinear optics, and nondiffracting waveforms generation for electron beams and quantum particles.

Acoustic Airy beams have great potential in acoustic beam manipulation, particle tracking, and acoustic focusing; however, one key challenge that hinders the broad application of acoustic Airy beam is the lack of simply built device to generate these beams. One approach to generate Airy beams is to use phased arrays, which generate desired Airy beams by dynamically modulating the phase delay of each independent transducer element. Although phased arrays have the advantage of being dynamically programmable, these arrays need a large number of transducers elements individually addressable by complex electronics. Another promising approach is to place an acoustic lens in front of a single-element planar transducer. Different design schemes of the acoustic lens have been provided, such as tailored acoustic phase mask, zero-index medium, and thermoacoustic phase control. However, these acoustic lens are 3D materials that may be bulky or complex in design.

Acoustic metasurfaces, which are 2D materials of sub-wavelength thickness, offer a great alternative to bulky 3D materials for acoustic wavefront manipulation. Since its inception, the field of acoustic metasurfaces has undergone rapid expansion. Acoustic metasurfaces enable the design of devices with complex and unprecedented functionalities and offer opportunities in many applications, such as beam focusing, cloaking, sound absorption, and anomalous reflection/refraction. Among them, beam focusing is one of the most fundamental examples of wavefront engineering. Acoustic focusing is important not only for fundamental research of wave propagation but also for applied research in fields such as biomedical imaging, therapy, nondestructive testing, and particle manipulation.

Several acoustic metasurfaces for generating symmetric Airy beams have been manufactured, including the space coiling-up structures, lossy holey structures, and Helmholtz-resonator-like structures. However, these pioneering studies focused on airborne sound waves with long wavelengths and often require the manufacturing of subwavelength units with complicated microstructures, which poses challenges to the fabrication for ultrasound since the typical wavelength is on the millimeter scale. Meanwhile, these structures rely mainly on the high acoustic impedance mismatch between air and the solid materials used to build these structures. Hence, the lack of sufficient impedance contrast between water and solid materials prevents the use of these designs for underwater applications.

The objective is to develop a family of 3D-printable Airy beam-enabled binary acoustic metasurfaces (AB-BAMs) to enable a broad range of applications in ultrasound wave manipulations. Binary acoustic metasurfaces have great promise in acoustic wave manipulation by constructing "digital metasurface bits" to acquire sophisticated functions in wave manipulation. Typically, binary acoustic metasurfaces are designed by macroscopically arranging two types of subwavelength meta-atoms with "0" and "1" digital states. Recently, Jiang et al. performed theoretical simulations to show that a binary acoustic metasurface could produce Airy beams in water. Their numerical simulations showed the capability of the binary phase modulation in generating ultrasharp focusing Airy beams. AB-BAMs are developed by a 3D printing technique using two coding bits, a polylactic acid unit acting as the bit "1" and a water unit acting as the bit "0. The distribution of the binary unit on AB-BAMs depends on the pattern of Airy beams. By combining numerical simulations with experimental measurements, we demonstrate the versatile capability of the 3D-printed AB-BAMs in tuning the focal size, flexible beam focusing in 3D, and generating a complex beam pattern that are continuously steerable along the axial direction.

II. METHOD

A. AB-BAM Design for Single-Point Focusing

In this section, we provide a full description of how the AB-BAM is designed. Considering a circular Airy beam propagating along the z-axis, the pressure profile of the Airy beam at the initial plane (z=0) may be described by:

$$p(x, y) = Ai(\frac{r_0 - \sqrt{(x - x_0)^2 + (y - y_0)^2}}{\omega})e^{(a\frac{r_0 - \sqrt{(x - x_0)^2 + (y - y_0)^2}}{\omega})}, \quad (1)$$

where $$Ai(s) = \frac{1}{\pi}\int_0^{\infty}\cos(t^3/3 + st)dt$$

is the Airy function, $r_0$ is a ring parameter related to the radial position of the primary Airy ring and $\omega$ is the radial scaling factor, (x, y) represent the coordinates on the initial plane of the metasurface, and the circle center $(x_0, y_0)$ decides the center of the initial plane of Airy beam, which directly defines the focused position of the AB-BAM in the xy-plane. In addition, the term $\alpha$ is an exponential decay factor in ensuring that the wave conveys finite energy, and it does not affect the phase distribution of the Airy beam ($\alpha$=0.002 for all designs in the example embodiment). The set of parameters ($r_0$, $\omega$) are named as property parameters, which determine the focal properties of the AB-BAM, including the focal depth ($z_0$), full length of half maximum (FLHM) and full width of half maximum (FWHM).

FIG. 4 shows designing binary metasurfaces. (a) shows the steps taken to design the AB-BAM for single-point focusing. First, the amplitude p(x,y) distribution of the Airy beam at its initial plane is calculated. The cross-sectional line of p(x,y) exhibits an oscillatory and exponential decaying nature with p(x,y)=0 being the turning point. Second, the pressure profile is converted to a binary phase with $\varphi(x,y)$=0 for p(x,y)>0 and $\varphi(x,y)$=$\pi$/2 for p(x,y)<0. Third, the binary phase map is rendered into a 3D-printed model for the design of a circular-shape AB-BAM. Finally, the 3D model is printed using a 3D printer (Ultimaker S5, Ultimaker, Netherlands) using the polylactic acid plastic as the filament at a printing resolutions of 250 $\mu$m and 10 $\mu$m for the surface and layer, respectively. We couple the printed AB-BAM with a planar single-element ultrasound transducer with a center frequency of 500 kHz and an aperture of 120 mm. in addition, the AB-BAM has a diameter of 120 mm to match the aperture of the transducer.

The phase delay of each pixel on the metasurface is proportional to its thickness. To produce a phase delay of $\pi$/2, the thickness of unit '1' (d) is calculated using $$\frac{2\pi f}{c_1}d - \frac{2\pi f}{c_2}d = \frac{\pi}{2},$$

where $c_1$ and $c_2$ are the sound speed of the water and polylactic acid, respectively, and f is the operating frequency. Thus, the thickness is represented as d=$c_1 c_2$/4f($c_2$−$c_1$). The pressure transmission coefficient (T) of each unit '1' may be calculated using:

$$T = \frac{2Z_r}{2Z_r\cos(2\pi fd/c_2) - i(Z_r^2 + 1)\sin(2\pi fd/c_2)},$$

where the normalized acoustic impedance is given by $Z_r$=$Z_2$/$Z_1$, the impedance of water is given by $Z_1$=$\rho_1 c_1$, and the impedance of polylactic acid is given by $Z_2$=$\rho_2 c_2$. The terms $\rho_1$ and $\rho_2$ are the densities of water and polylactic acid, respectively.

The acoustical properties of polylactic acid material are obtained experimentally using a pulse-echo technique in a cubic structure, resulting in a measured sound speed of 2212 m/s, and a density of 1223 kg/m$^3$, and absorption of 3.54 dB/cm for 500 kHz. These measurements matched those reported in previous studies. Water as the surrounding medium has a sound speed of 1484 m/s and mass density of 998 kg/m$^3$ at room temperature. The thickness of the AB-BAM is calculated to be 2.35 mm for a 500 kHz transducer, which is approximately 0.8$\lambda$ ($\lambda$=2.97 mm). The metasurface includes two printed parts. The first part is the polylactic acid unit on the metasurface with a depth of 2.25 mm that provides $\pi$/2 phase shift for the 500 kHz transmitted ultrasonic wave. The second portion is the base plate printed at a thickness of 0.10 mm, which is needed to stabilize the metasurface. The pressure transmission coefficient is 99.6% for unit '1', which indicates efficient transmission through the metasurface.

The designed AB-BAMs enable flexible and versatile ultrasound beam manipulations. In the example embodiment, we demonstrate that AB-BAMs may achieve tunable focusing properties, flexible beam focusing, arbitrary multi-point focusing, and continuous steering. We may achieve a sharp-focused beam [FIG. 4(b)] with a small FLHM and a large FWHM and a needle-focused beam [FIG. 4(c)] with a large FLHM and a small FWHM. In sharp focusing, the focal points form into a shape resembling a sharp point. In needle focusing, the focal points form into a shape resembling a needle. The focus of the Airy beams may be steered along the center axis of the metasurface. Moreover, the focus may be steered off-axis by moving the ring center $(x_0, y_0)$ from the geometric center $(0, 0)$ to off-center $(x_m, y_m) \neq (0, 0)$. As illustrated in FIG. 4(d), the amplitude profile of an Airy beam centered at $(x_1, y_1)$ is calculated and then transformed into a binary phase profile for off-axis steering. The focus of the AB-BAM may also be tuned continuously along propagation direction by adjusting the operating frequency of the planar transducer without replacing the AB-BAMs.

B. AB-BAM Design for Multi-Point Focusing

In addition to single-point focusing, AB-BAMs may be designed to generate multifocal points through the superimposing method. The final amplitude map p(x, y) may be expressed as:

$$p(x, y) = \Sigma_m p_m(x, y), m = 1, 2, \ldots \quad (2)$$

$$p_m(x, y) = Ai(\frac{r_0 - \sqrt{(x - x_m)^2 + (y - y_m)^2}}{\omega})e^{(a\frac{r_0 - \sqrt{(x - x_m)^2 + (y - y_m)^2}}{\omega})}.$$

As a demonstration of this capability, we designed AB-BAMs for double focusing and generating patterns of "W" and "U". For the generation of two foci, the amplitude distribution p(x, y) at the initial plane is calculated by the superposition of the Airy beam patterns with two foci $[p_1(x, y)$ and $p_2(x, y)]$, as illustrated in FIG. 4(e). The superimposed amplitude map p(x,y) is transformed into a binary phase map φ(x,y) to generate an ultrasound field with double focusing. The superposition method may be extended to form arbitrary focusing patterns in space, such as the letters "W" and "U".

C. Numerical Simulation and Experimental Validation

Several examples of AB-BAMs are designed and 3D-printed to showcase the wavefront engineering capability of the AB-BAMs. We performed numerical simulations and experimental measurements to validate the performance of the 3D printed AB-BAMs.

Numerical simulations of the 3D acoustic pressure fields generated by the AB-BAMs that are coupled with a planar and uniform incident wave is performed using an open-source MATLAB toolbox, k-Wave, and pseudospectral method with k-space dispersion correction. Cluster computing with one graphics processing unit (Nvidia Tesla V100, Nvidia Corporation, Santa Clara, CA, USA) is used to accelerate the 3D simulations. A numerical grid with a spatial step of $\Delta x = \Delta y = \Delta z = 200$ μm and a numerical temporal step of $\Delta t = 20$ ns are used, which leads to a Courant-Friedrichs-Lewy number of 0.1 and a spatial sampling of approximately 15 grid points per wavelength in water for a frequency of 0.5 MHz. These parameters are fixed for all simulations in this example embodiment.

Experimental validation is carried out by coupling the 3D-printed metasurfaces with the 500 kHz ultrasound transducer. The ultrasound transducer is made of a single-element circular lead zirconate titanate (PZT) ceramic (DL-20, Del Piezo Specialties LLC, West Palm Beach, FL, USA). Two wires are soldered to the two electrodes of the transducer and connected to an electrical driving system composed of a function generator (Model 33500B, Keysight Technologies Inc., Englewood, CO, USA) and a power amplifier (1020L, Electronics & Innovation, Rochester, NY, USA). The transducer is mounted in a 3D-printed housing. The ultrasound pressure fields are measured using a lipstick hydrophone (HGL-200, ONDA Corporation, Sunnyvale, CA) in a water tank filled with degassed and deionized water at 22°. The hydrophone is connected to a pre-amplifier (AG-20X0, Onda Corp., Sunnyvale, CA, USA) and a digital oscilloscope (Picoscope 5443D, St. Neots, United Kingdom) and is moved in 3D using a computer-controlled 3D stage (PK245-01AA, Velmex Inc., NY, USA). The 3D stage is controlled to move at a step size of 0.3 mm over a scanning volume that covers the focal patterns of the ultrasound fields. The calibration was conducted by driving the ultrasound transducer with a 20-cycle pulsed wave with a pulse repetition frequency of 100 Hz.

III. RESULTS

A. Tunable Focusing Properties

Figure 5:
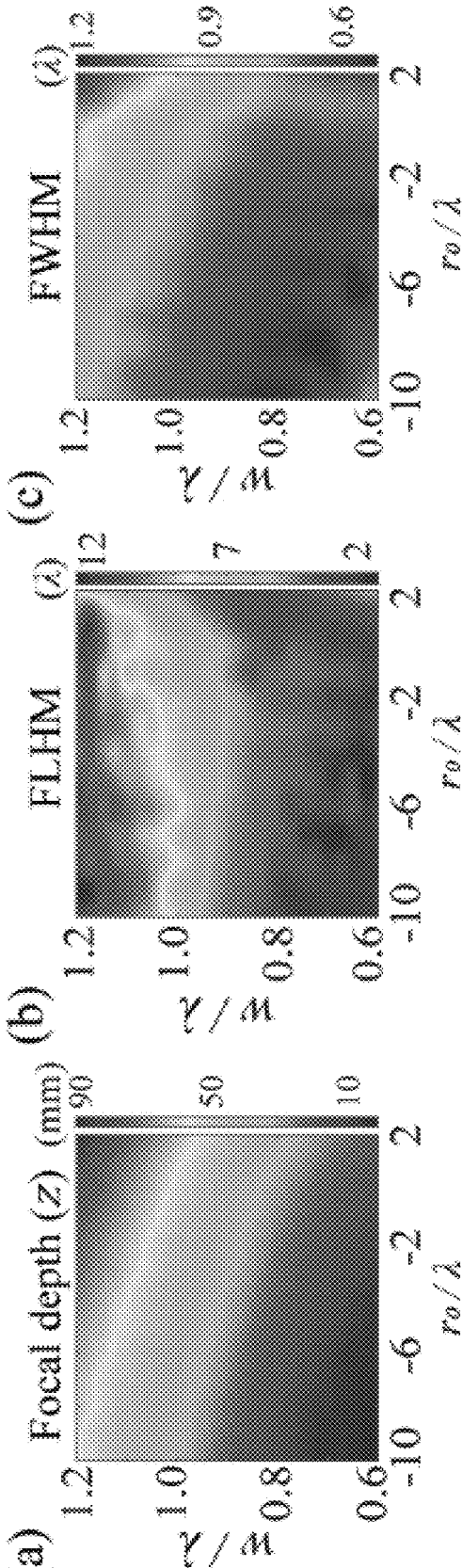
FIG. 5 shows tunable focusing properties of AB-BAMs. The operating frequency is 500 kHz, $r_0/\lambda$ is within the range of [−10, 2], and w/$\lambda$ is within the range of [0.6, 1.2]. The simulation results show that (a) the focal depth is tunable from mm to 90.0 mm, (b) the FWHM is tunable from 1.33$\lambda$ to 12.61$\lambda$, and (c) the FWHM is tunable from 0.51$\lambda$ to 1.20$\lambda$.

The focusing properties of AB-BAMs, which include focal depth, FLHM, and FWHM, are tunable by modulating the property parameters $(r_0, \omega)$. Over a selected parameter space with $r_0/\lambda$ in the range of $[-10, 2]$ and $w/\lambda$ in the range of $[0.6, 1.2]$, numerical simulations show that the focal depth of the ultrasound beam may be tuned from 0.1 mm to 90 mm [FIG. 5(a)], FLHM may vary from $1.33\lambda$ to $12.61\lambda$ [FIG. 5(b)], and FWHM may change from $0.51\lambda$ to $1.20\lambda$ [FIG. 5(c)]. The numerical results highlight the flexibility of AB-BAMs in tuning the focusing properties.

Figure 6:
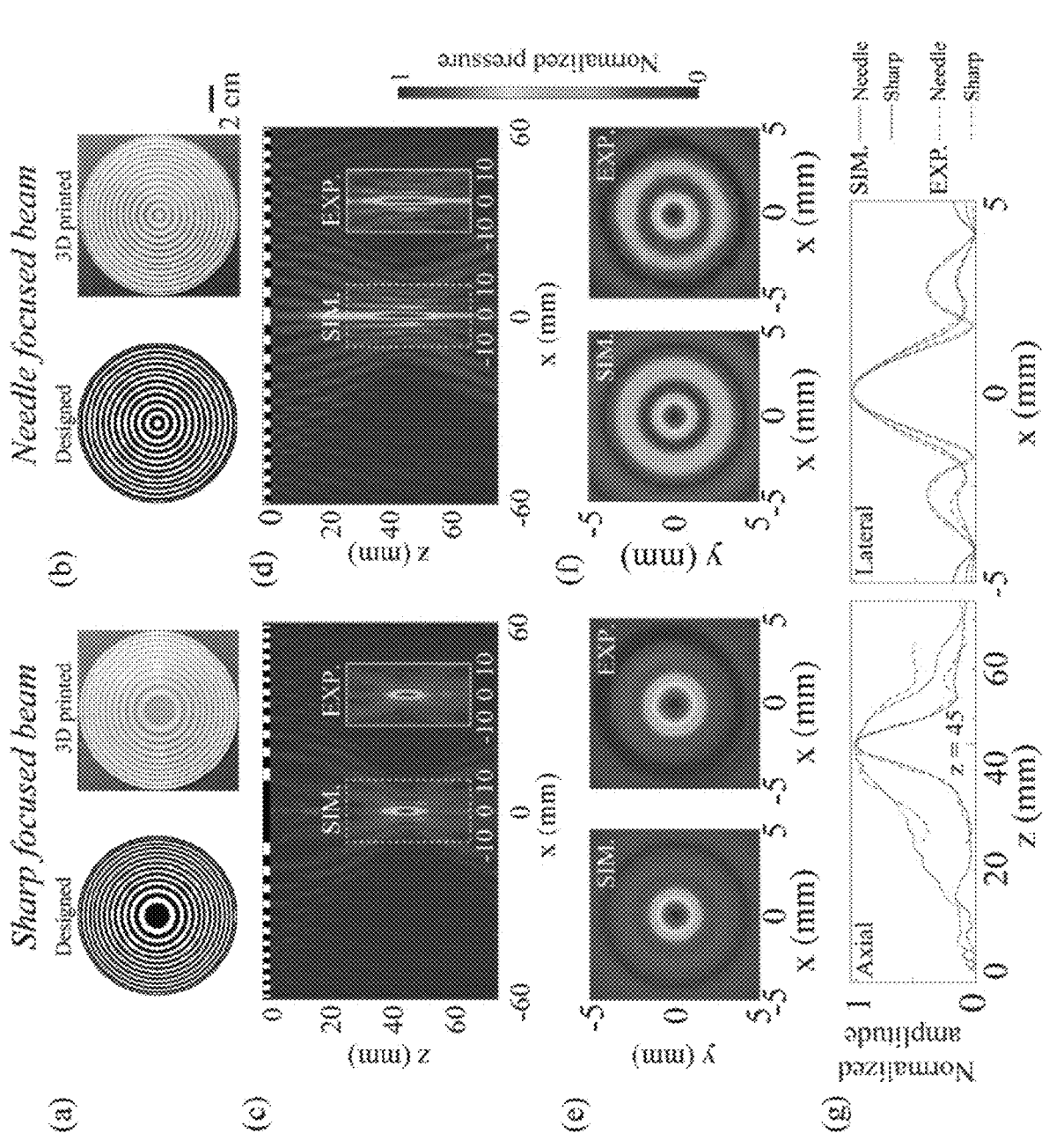
FIG. 6 are two examples to demonstrate the tunable focusing properties of AB-BAMs. AB-BAMs for (a) sharp-focused beam ($r_0$=1.73, $\omega$=0.89), and (b) needle-focused beam ($r_0$=−9.00, $\omega$=1.10) at a focal depth z=45 mm are designed (left) and 3D-printed (right). Simulated (SIM.) and experimental (EXP.) measured ultrasound pressure fields in the axial xz-plane are shown for (c) sharp focused beam and (d) needle focused beam. The corresponding ultrasound fields in the lateral xy-plane are presented for the (e) sharp focused beam and (f) needle focused beam. The pressure fields are normalized to the peak pressure. (g) Simulated and experimentally measured axial and lateral focal beam profiles across the focal point for sharp and needle focused beams. The measured peak pressure of sharp- and needle-focused beams are 0.93 MPa and 0.61 MPa, respectively.

Two AB-BAMs are 3D printed to demonstrate the unique capability of AB-BAMs in tuning the focusing properties. These two metasurfaces are designed to achieve sharp and needle focusing at the same focal depth z=45 mm, respectively. FIGS. 6(a-b) show the designed and 3D-printed AB-BAMs. The sharp focused beam is designed with $(r_0 = 1.73, \omega = 0.89)$, and the needle-focused beam is designed with $(r_0 = -9.00, \omega = 1.10)$. The simulated and measured ultrasound fields in the axial plane are presented in FIGS. 6(c-d) and the ones for the lateral plane are presented in FIGS. 6(e-f). The axial and lateral beam profiles across the focal point are shown in FIG. 6(g). Numerical simulation finds that the sharp focused beam has a short focal length with an FLHM of $3.36\lambda$ and FWHM of $0.81\lambda$. The needle focused beam has an elongated focal region with an FLHM of $11.15\lambda$ and FWHM of $0.69\lambda$. On the other hand, the experimental results show that the FLHM and FWHM are $3.42\lambda$ and $0.83\lambda$ for the sharp focused beam and $10.96\lambda$ and $0.72\lambda$ for the needle focused beam. The numerical simulation and experimental measurements are in good agreement. These two examples demonstrate that the focusing properties of AB-BAMs are highly tunable by modulating the pattern of Airy beams. Different focusing patterns may be used for various ultrasound applications. For example, high-intensity focused ultrasound (HIFU) therapy requires a beam with a short axial length to avoid off-target effects in the surrounding tissue, whereas ultrasound imaging requires a beam with narrow lateral focal dimensions to improve the lateral imaging resolution.

B. Flexible Beam Focusing in 3D

Figure 7:
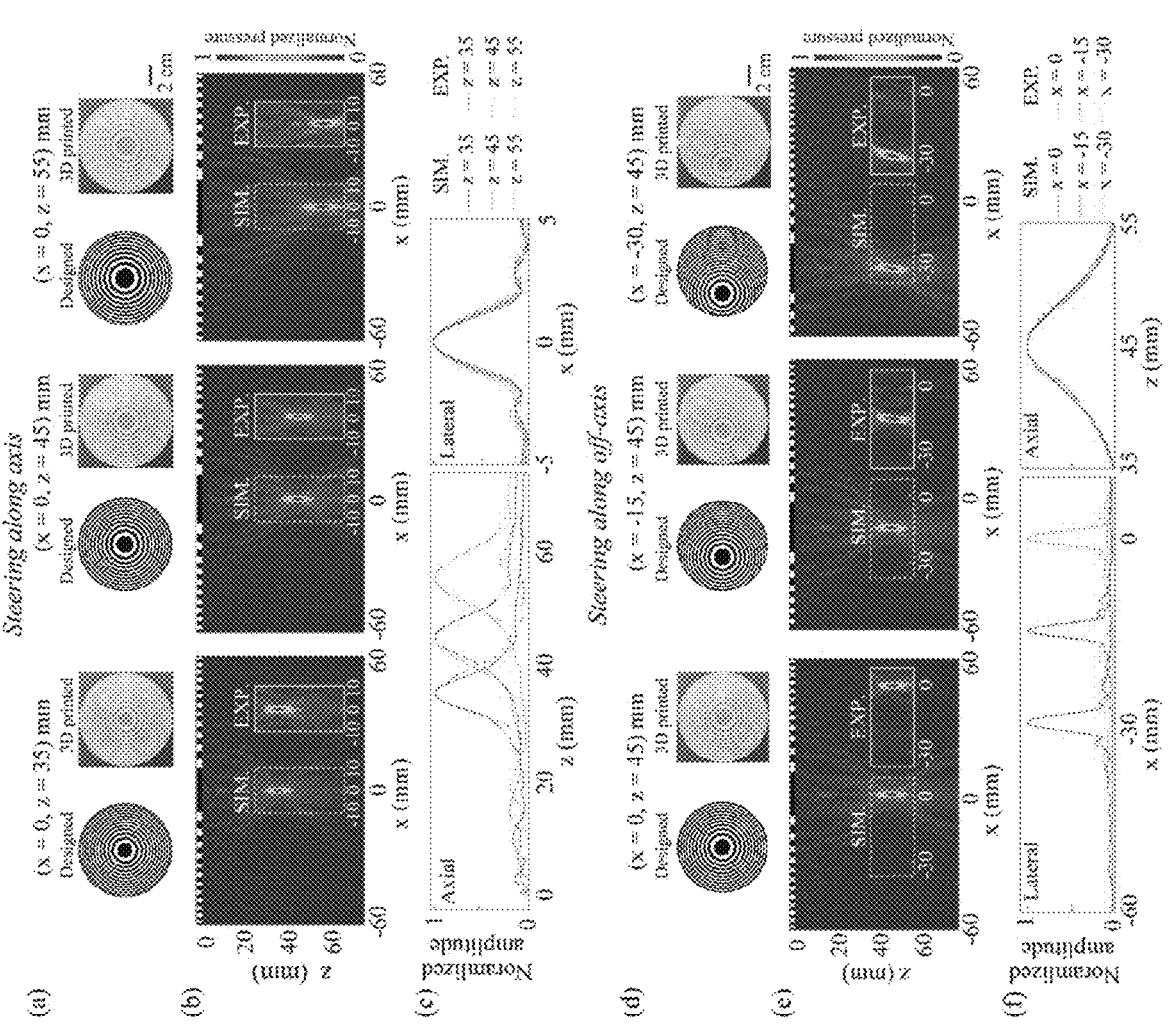
FIG. 7 shows flexible focusing in 3D space with AB-BAMs. (a) The designed and 3D-printed AB-BAM for steering along the axis at x=0 with z=35 mm ($r_0$=1.38, $\omega$=0.83), z=45 mm ($r_0$=1.73, $\omega$=0.89), and z=55 mm ($r_0$=1.98, $\omega$=0.97). (b) The simulated and experimentally measured (offset) ultrasound fields in the xz-plane when steering along the axis with z=35 mm, z=45 mm, and z=55 mm (c) Corresponding normalized axial and lateral beam profiles. The measured peak pressures are 0.81, 0.93 and 0.88 MPa for z=35, 45 and 55 mm, respectively. (d) The designed and 3D printed AB-BAMs for steering off-axis at z=45 mm with x=0 mm, x=−15 mm, and x=−30 mm, respectively. (e) Resulting fields from experiments and simulations when steering along off-axis at z=45 mm with x=0 mm, x=−15 mm and x=−30 mm. (f) Corresponding normalized lateral and axial beam profiles when steering off-axis. The measured peak pressures are 0.93, 0.85 and 0.74 MPa for x=0, −15 and −30 mm, respectively.

AB-BAMs have the capability to flexibly adjust their foci in 3D space by changing the design parameters. We designed and 3D-printed several AB-BAMs to demonstrate this capability. FIG. 7(a) shows the designed and 3D printed AB-BAMs for beam focusing along the center axis of the metasurface. Three AB-BAMs were designed using different sets of property parameters $(r_0 = 1.38, \omega = 0.83)$, $(r_0 = 1.73, \omega = 0.89)$, and $(r_0 = 1.98, \omega = 0.97)$ to achieve focal depths of z=35 mm, z=45 mm, and z=mm, respectively. FIG. 7(*b*) displays the simulated and measured ultrasound fields on the xz-plane. The corresponding normalized axial and lateral focal beam profiles for each focal depth are presented in FIG. 7(*c*). Both the FWHM and FLHM slightly increase as the focal depth increases. Based on the simulation results, the FWHMs are $0.74\lambda$, $0.81\lambda$, and $0.88\lambda$, and the FLHMs are $2.74\lambda$, $3.36\lambda$, and $4.42\lambda$ for the focal depths of z=35 mm, 45 mm, and 55 mm, respectively. The corresponding experimental results find that the corresponding FWHMs are $0.79\lambda$, $0.83\lambda$, and $0.93\lambda$, and the FLHMs are $3.02\lambda$, $3.42\lambda$, and $4.45\lambda$. The experimental measurements match the simulation results and agree well with the design.

FIG. 7(*d*) shows the designed and 3D printed AB-BAMs for off-axis beam focusing. The circle center $(x_0, y_0)$ is set at $(0, 0)$ mm, $(-15, 0)$ mm, and $(-30, 0)$ mm, with a constant focal depth z=45 mm $(r_0=1.73, \omega=0.89)$, to design three AB-BAMs focusing respectively at x=0 mm, x=−15 mm, and x=−30 mm, respectively. FIG. 7(*e*) displays the simulated and measured ultrasound fields on the xz-plane when the focus is steered off-axis. The generated acoustic fields accurately match the simulations. FIG. 7(*f*) presents the corresponding normalized axial and lateral beam profiles from the simulations and experiments. As the focused beam steers from 0 mm to −30 mm off-axis, the FLHM remains almost the same at ~$3.36\lambda$ in simulations and ~$3.42\lambda$ in experiments, while the FWHM progressively increases and are from $0.81\lambda$, $0.84\lambda$, to in the simulations and $0.83\lambda$, $0.87\lambda$, and $1.02\lambda$ in the experiments. The above findings suggest that the focal position of AB-BAMs may be adjusted along the axis and off-axis. The 3D arbitrarily focusing property of AB-BAM makes the metasurface a versatile tool for various applications.

C. Arbitrary Multi-Point Focusing

The previous results demonstrate the flexibility of AB-BAMs for single-point focusing. In this subsection, we extend the applications of AB-BAMs to achieve arbitrary multi-point focusing.

Figure 8:
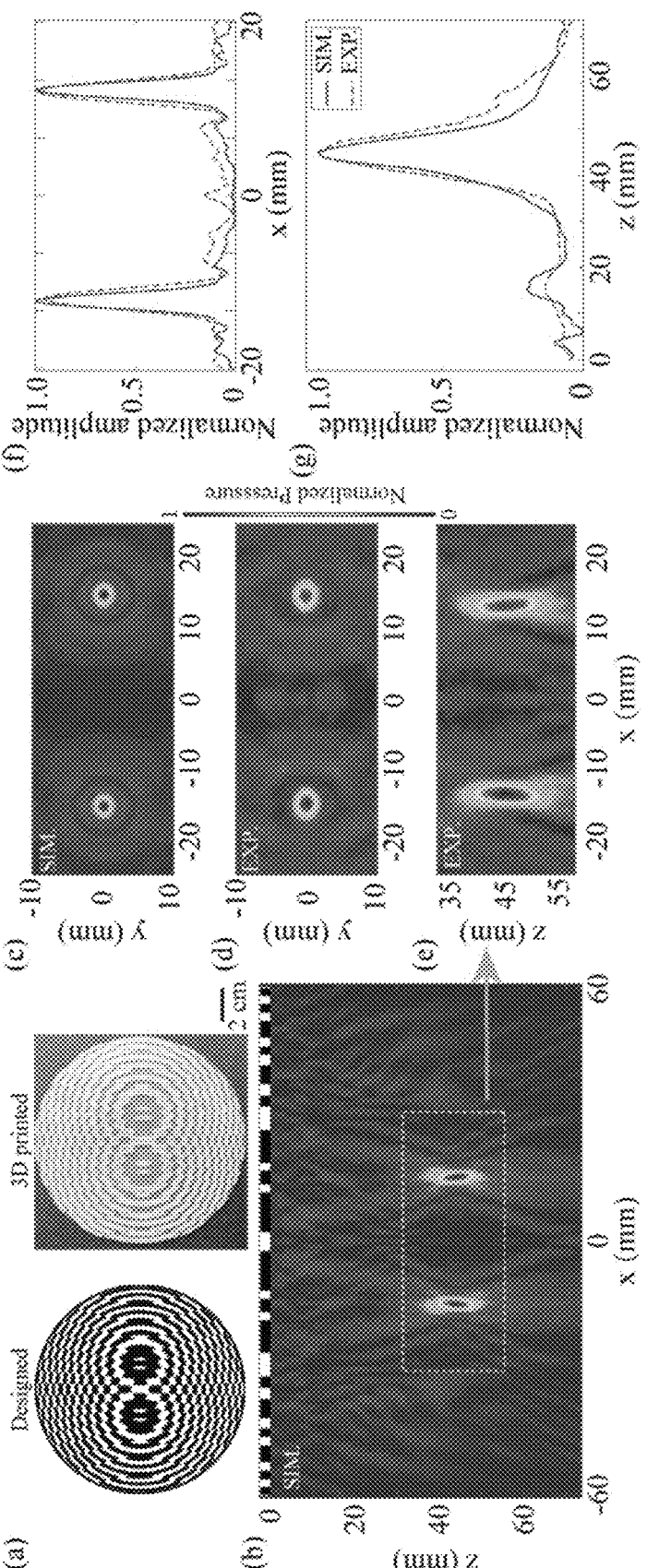
FIG. 8 shows AB-BAM for double focusing. (a) The designed and 3D-printed AB-BAM for double focusing at z=45 mm. The ultrasound field in the xz-plane by simulation (b) and experiment (e). (c), (d) Corresponding lateral field in xz-plane. (f), (g) Simulated and experimentally measured axial and lateral pressure profiles. The measured peak pressure is 0.73 MPa.

FIG. 8(*a*) shows the designed and printed bifocal AB-BAM for the bilateral focus. The focal points were set to (x=−15, y=0, z=45) mm and (x=15, y=z=45) mm, respectively, by superimposing the patterns of two Airy beams at the initial plane. Specifically, the two Airy beams are designed with the circle center located at $(x_0=-15, y_0=0)$ mm and $(x_0=15, y_0=0)$ mm using the same property parameters $(r_0=1.73, \omega=0.89)$ at a focal depth of 45 mm, respectively. FIGS. 8(*b*) and 8(*e*) show the ultrasound fields generated in the xz-plane by simulation and experimental measurements, respectively. The lateral ultrasound fields in the xy-plane are shown in FIGS. 8(*c*) and 8(*d*). Excellent agreement is observed between the simulation and experiments. The lateral and axial beamforms across the focus are shown in FIGS. 8(*f*) and 8(*g*). Additionally, the FWHM and FLHM from the experiments ($0.95\lambda$ and $3.64\lambda$, respectively) are in good agreement with the simulations ($0.87\lambda$ and $3.53\lambda$, respectively).

Figure 9:
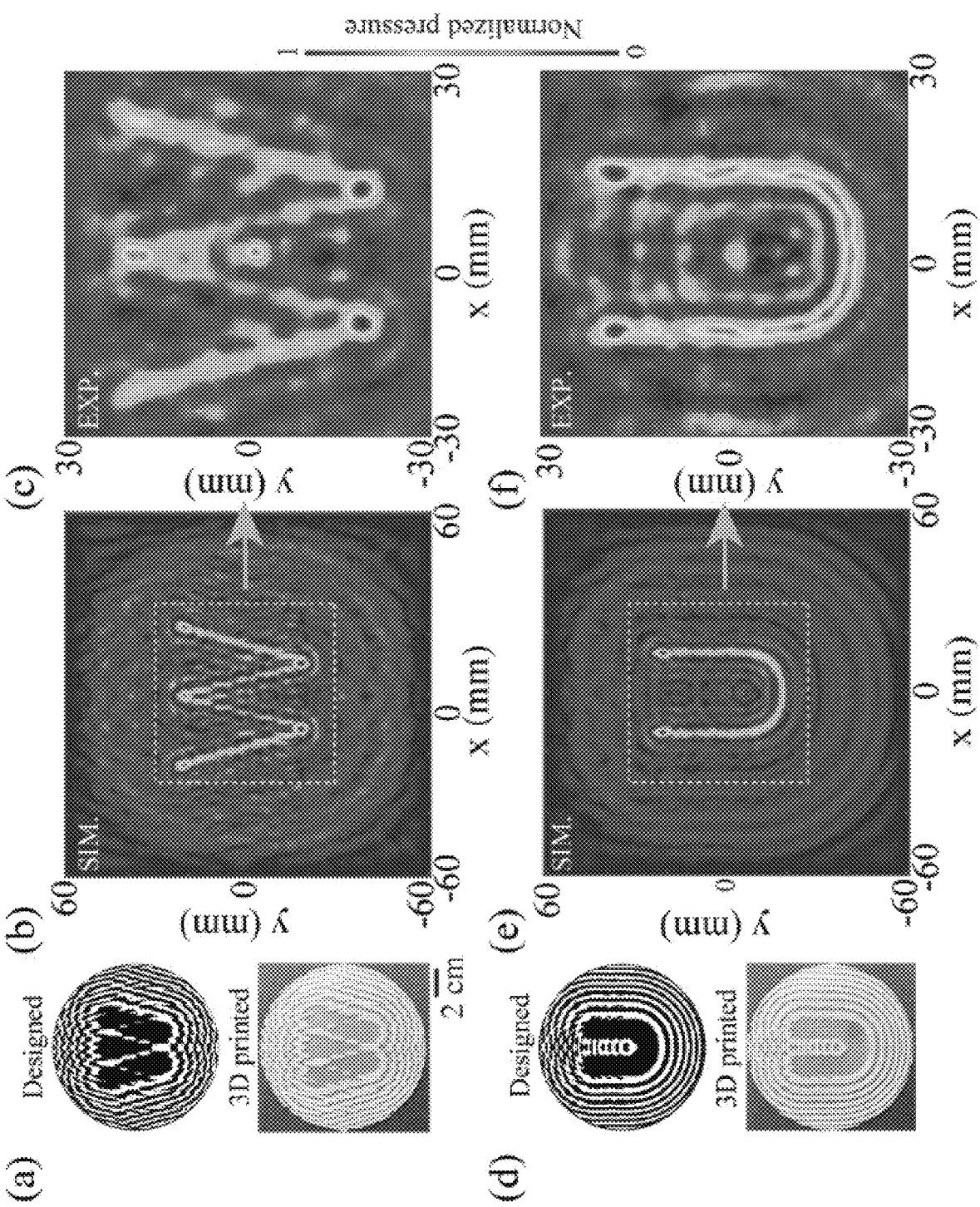
FIG. 9 shows multipoint focusing to generate the letters "W" and "U". (a) The designed and 3D printed AB-BAM to generate the letter "W". (b) Simulated and (c) experimentally measured pressure fields with the AB-BAM shown in (a). (d) Simulated and 3D-printed AB-BAM to generate the letter "U". (e) Simulated and (0 experimentally measured pressure fields with AB-BAM shown in (d). The focal depth is mm.

Complex multi-point patterns such as the letters "W" and "U" may also be generated by AB-BAMs. FIGS. 9(*a*) and 9(*d*) show the designed and printed AB-BAMs that generate the letter "W" and "U" patterns in the focal plane at z=mm with the property parameters $(r_0=1.38, \omega=0.83)$. FIGS. 9(*b*) and 9(*e*) present the simulated acoustic pressure fields at the focal plane, where the letters are distinctly visible. FIGS. 9(*c*) and 9(*f*) show the experimentally measured ultrasound fields at the focal plane, where both letters are distinctly visible. The simulation and experiment show agreement in the overall shapes of the patterns. The discrepancy between simulation and experiment may be attributed to a slight error in the 3D-printed binary phase profile caused by fabrication error and shear mode conversion in the PLA material. These examples demonstrate that arbitrary multi-point focusing may be realized by AB-BAMs through the superposition method, which may broaden the applications of acoustic Airy beams.

D. Continuously Steerable Arbitrary Pattern Focusing

One property of the AB-BAM is that it may continuously steer the beam focus along the wave propagation direction by modulating the operating frequency of the planar transducer without the need to switch the metasurface. In this subsection, we evaluate the continuously steerable properties of the AB-BAM by changing its operating frequency for single and multifocal beams.

Figure 10:
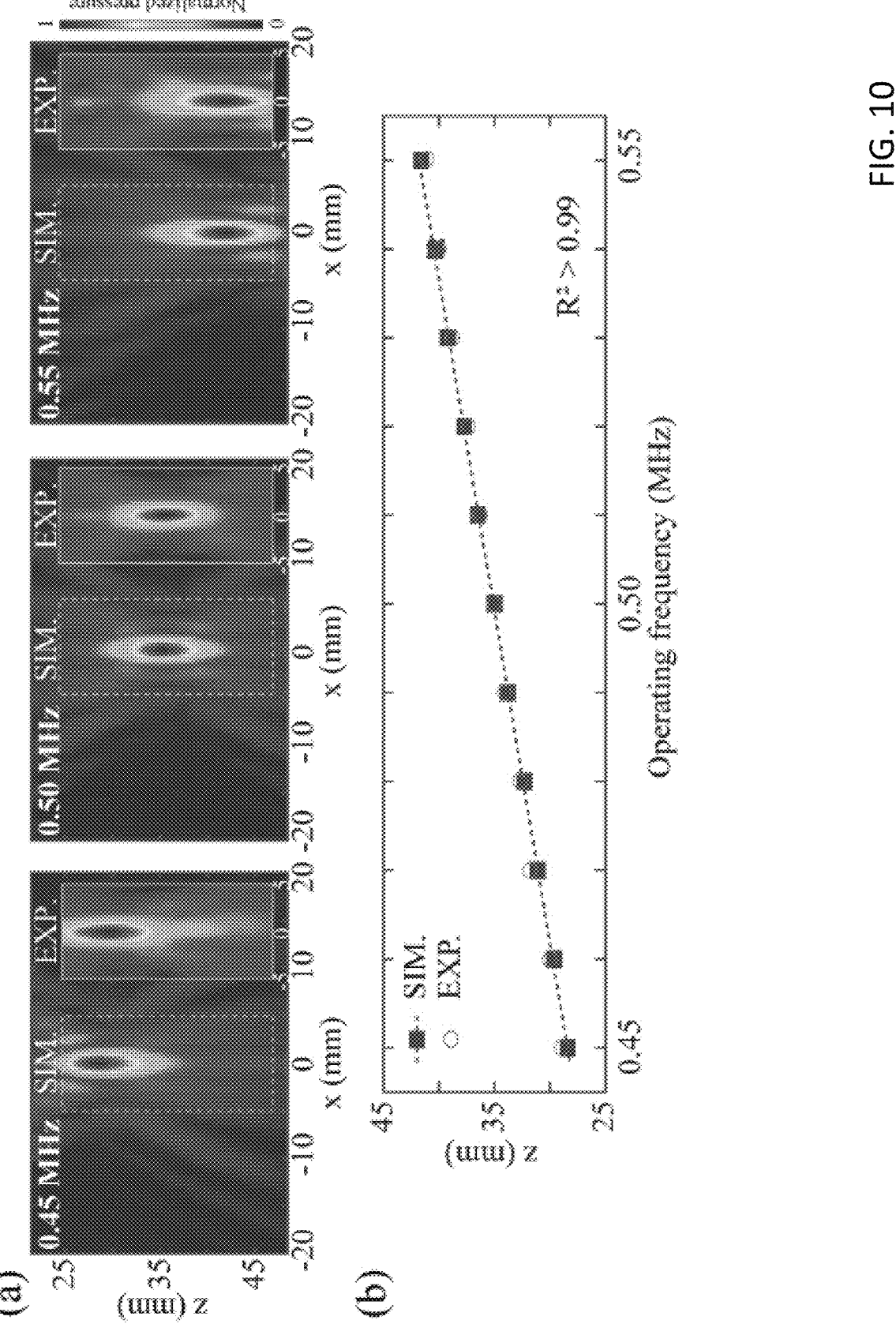
FIG. 10 shows electronical steering of a single focusing point by changing the operating frequency. (a) Simulated and experimentally measured ultrasound fields in the xz-plane at 0.45, 0.50, and 0.55 MHz, respectively. (b) Simulated (solid squares) and experimentally measured (open circles) focal depths $z_0$ from 0.45 to 0.55 MHz. The measured peak pressure varies from 0.82 to 0.98 MPa as the frequency increases from 0.45 to 0.55 MHz.

For single-point focusing, we show that designed and 3D-printed AB-BAMs may dynamically tune the focal depth from 28.4 mm to 41.6 mm by increasing the operating frequencies from 0.45 to 0.55 MHz. This frequency range is the bandwidth of the planar transducer. A linear relationship ($R^2>0.99$) between the focal depth z and the operating frequency is found as shown in FIG. 10(*b*). The experimental results agreed well with the numerical results, with an average relative difference between the experiment and simulation of approximately 3%.

Figure 11:
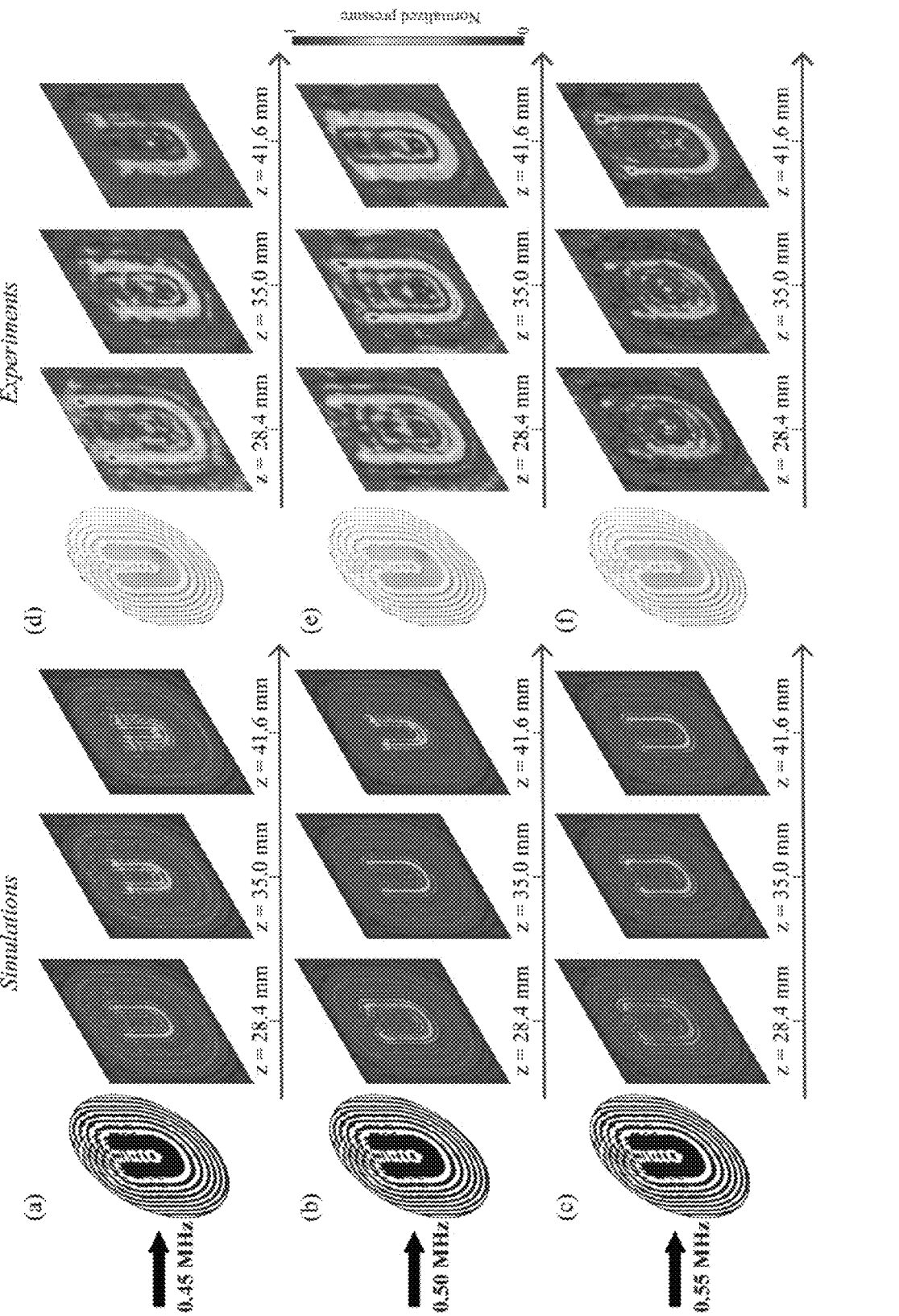
FIG. 11 shows electronical steering of the letter "U" pattern by changing the operating frequency. Simulated pressure field at depths of 28.4 mm, 35.0 mm, and 41.6 mm by operating frequency of (a) 0.45 MHz, (b) 0.50 MHz, and (c) 0.55 MHz, respectively. The corresponding experimental pressure field under an operating frequency of (d) 0.45 MHz, (e) 0.50 MHz and (f) 0.55 MHz, respectively. Color bar in units normalized to the peak pressure of each operating frequency.

AB-BAMs may also be used to continuously steer an arbitrary focusing pattern, as demonstrated in FIG. 11. FIGS. 11(*a*)-11(*c*) show that the multifocal point beam with the pattern of the letter "U" is steerable to z=28.4 mm, z=mm, and z=41.6 mm by changing the operating frequency from 0.45, 0.50 to 0.55 MHz, respectively. As shown in FIG. 11(*a*)-11(*c*), the letter "U" is distinctly visible at z=28.4 mm, z=35.0 mm, and z=41.6 mm when the frequency increases from 0.45, 0.50, to 0.55 MHz, respectively. Overall, the experimental measurements presented in FIGS. 11(*d*)-11(*f*) agree well with the simulation results. Thus, the generated multifocal point beam by AB-BAM may work over a broad frequency range and be able to continuously steer by the operating frequency.

IV. CONCLUSION

We designed and 3D-printed AB-BAMs for ultrasound beam manipulation and demonstrated their capability in ultrasound beam manipulation in water. AB-BAM is a unique binary acoustic lens because it is designed based on Airy beams, which have the peculiar properties of non-diffracting, self-accelerating, and self-healing. Several features of the AB-BAM are demonstrated. First, AB-BAMs may finely tune the focusing properties such as the FLHM and FWHM by changing the property parameters $(r_0, \omega)$ and customized to various applications. Second, AB-BAMs may flexibly adjust the focus in 3D space both along the axis and off-axis by modulating the property parameters $(r_0, \omega)$ and circle center $(x_0, y_0)$. Third, arbitrary multi-point focusing, such as double focusing and even complex pattern like letters "W" and "U", may be achieved through the superimposing method, avoiding the application of iterative method during acoustic hologram design, which may effectively reduce the time in fabrication and production. Fourth, the focus of the AB-BAM may also be tuned continuously by adjusting the operating frequency for both single-point and multi-point focusing beam.

In the example embodiment, AB-BAMs are developed for homogeneous media. The generated ultrasound beams may be distorted in heterogeneous media such as the skull. The potential solution is to design AB-BAMs to couple with ultrasound transducers at lower frequencies such as 200 kHz. At such a low frequency, the aberration induced by the skull is not significant. Further, as a proof-of-concept, our experimental measurements were conducted with the peak pressures <1 MPa, as an example for illustration purposes only. Higher pressure levels may be generated for applications such as HIFU therapy. The nonlinear effects associated with high-pressure wave propagation may be be considered when designing the AB-BAM for these applications. The focusing properties (FLHM and FWHM) of AB-BAMs are highly related to the acoustic properties of the 3D printing material. A PLA material is described here as an example for illustration purposes. AB-BAMs may be printed with other 3D printable materials.

In conclusion, it is demonstrated that 3D-printed AB-BAMs provide a flexible and versatile tool for ultrasound beam manipulation. It may be easily and accurately manufactured by 3D printing. Complex acoustic patterns may be generated with the AB-BAMs coupled with a single-element planar ultrasonic transducer. The 3D-printed AB-BAMs may achieve tunable focal region size, flexible focusing in 3D, arbitrary multipoint focusing, and continuous steerability, which has the unprecedented potential for different applications such as neuromodulation, HIFU therapy, ultrasound-mediated microbubbles for blood-brain barrier opening for brain drug delivery or enriching the brain tumor-derived molecular biomarkers for sonobiopsy.

At least one technical effect of the systems and methods described herein includes (a) binary metasurfaces for producing Airy beams; (b) methods of fabricating a binary metasurface; (c) methods of producing Airy beams;

Example embodiments of metasurfaces and systems and methods for fabricating metasurfaces and producing Airy beams are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of fabricating a binary metasurface for producing an ultrasound Airy beam for underwater ultrasound applications, comprising:
    generating an amplitude distribution of an Airy beam at a frequency;

converting the amplitude distribution into a binary phase profile;
    generating a 3D printing design of a binary metasurface based on the binary phase profile, wherein the binary metasurface includes ridges and grooves defined by neighboring ridges, a ridge having a thickness corresponding to a phase delay of $\pi/2$ of the Airy beam between water and a 3D-printable material; and
    additively manufacturing the binary metasurface with the 3D-printable material based on the 3D printing design.

2. The method of claim 1, wherein:
    converting the amplitude distribution further comprises:
        assigning a phase in the binary phase profile to a bit of one if an amplitude in the amplitude distribution is greater than or equal to zero; and
        assigning the phase to a bit of zero if the amplitude is less than zero; and
    generating a 3D printing design further comprises:
        representing the bit of one with a ridge; and
        representing the bit of zero with a groove.

3. The method of claim 1, wherein the Airy beam is sharp focused, and generating an amplitude distribution further comprises:
    adjusting the amplitude distribution of the Airy beam by:
        decreasing a full length half maximum (FLHM) of the Airy beam; and
        increasing a full width half maximum (FWHM) of the Airy beam.

4. The method of claim 1, wherein the Airy beam is needle focused, and generating an amplitude distribution further comprises:
    adjusting the amplitude distribution of the Airy beam by:
        increasing an FLHM of the Airy beam; and
        decreasing an FWHM of the Airy beam.

5. The method of claim 1, wherein the Airy beam is off-axis, and generating an amplitude distribution further comprises:
    moving a ring center of the Airy beam off-center.

6. The method of claim 1, wherein the Airy beam includes a first ring center and a second ring center, and generating an amplitude distribution further comprises:
    generating a first amplitude distribution of an Airy beam having the first ring center;
    generating a second amplitude distribution of an Airy beam having the second ring center; and
    generating the amplitude distribution by superimposing the first amplitude distribution with the second amplitude distribution.

7. The method of claim 1, wherein the Airy beam includes a plurality of ring centers in a pattern, and generating an amplitude distribution further comprises:
    for each ring center of the plurality of ring centers,
        generating an amplitude distribution of an Airy beam having the each ring center; and
    generating the amplitude distribution by superimposing the amplitude distributions corresponding to the plurality of ring centers.

8. A method of producing an ultrasound Airy beam for underwater ultrasound applications, comprising:
    providing a binary metasurface, wherein the binary metasurface is fabricated by:
        generating an amplitude distribution of an Airy beam at a frequency;
        converting the amplitude distribution into a binary phase profile;
        generating a 3D printing design of the binary metasurface based on the binary phase profile, wherein the binary metasurface includes ridges and grooves defined by neighboring ridges, a thickness of a ridge corresponding to a phase delay of $\pi/2$ of the Airy beam between water and a 3D-printable material; and additively manufacturing the binary metasurface with the 3D-printable material based on the 3D printing design;

coupling the binary metasurface with a transducer configured to emit an ultrasound wave at the frequency; and producing the Airy beam by projecting the ultrasound wave towards the binary metasurface.

9. The method of claim 8, wherein:

converting the amplitude distribution further comprises:
  assigning a phase in the binary phase profile to a bit of one if an amplitude in the amplitude distribution is greater than or equal to zero; and
  assigning the phase to a bit of zero if the amplitude is less than zero; and generating a 3D printing design further comprises:
  representing the bit of one with a ridge; and
  representing the bit of zero with a groove.

10. The method of claim 8, wherein the Airy beam is sharp focused, and generating an amplitude distribution further comprises:
  adjusting the amplitude distribution of the Airy beam by:
    decreasing a full length half maximum (FLHM) of the Airy beam; and
    increasing a full width half maximum (FWHM) of the Airy beam.

11. The method of claim 8, wherein the Airy beam is needle focused, and generating an amplitude distribution further comprises:
  adjusting the amplitude distribution of the Airy beam by:
    increasing an FLHM of the Airy beam; and
    decreasing an FWHM of the Airy beam.

12. The method of claim 8, wherein the Airy beam is off-axis, and generating an amplitude distribution further comprises:
  moving a ring center of the Airy beam off-center.

13. The method of claim 8, wherein the Airy beam includes a first ring center and a second ring center, and generating an amplitude distribution further comprises:
  generating a first amplitude distribution of an Airy beam having the first ring center;
  generating a second amplitude distribution of an Airy beam having the second ring center; and
  generating the amplitude distribution by superimposing the first amplitude distribution with the second amplitude distribution.

14. The method of claim 8, wherein producing the Airy beam further comprises:
  steering the Airy beam to a different focal depth by adjusting the frequency to correspond to the different focal depth.

15. The method of claim 14, wherein producing the Airy beam further comprises:
  continuously steering the Airy beam by continuously adjusting the frequency.

16. A binary metasurface for producing ultrasound Airy beams in underwater applications, the binary metasurface comprising:
  ridges; and
  grooves defined by neighboring ridges,
  wherein the binary metasurface is additively manufactured with a 3D-printable material based on a 3D printing design corresponding to a binary phase profile, a thickness of a ridge corresponding to a phase delay of $\pi/2$ between water and the 3D-printable material of an Airy beam at a frequency, and the binary phase profile is converted from an amplitude distribution of the Airy beam at the frequency.

17. The binary metasurface of claim 16, wherein the amplitude distribution is converted into the binary phase profile by assigning a phase in the binary phase profile to a bit of one if an amplitude in the amplitude distribution is greater than or equal to zero, and assigning the phase to a bit of zero if the amplitude is less than zero, a ridge corresponds to the bit of one, and a groove corresponds to the bit of zero.

18. The binary metasurface of claim 16, wherein the Airy beam is needle focused, and the amplitude distribution is generated by:
  adjusting the amplitude distribution of the Airy beam by:
    increasing an FLHM of the Airy beam; and
    decreasing an FWHM of the Airy beam.

19. The binary metasurface of claim 16, wherein the Airy beam is off-axis, and the amplitude distribution is generated by:
  moving a ring center of the Airy beam off-center.

20. The binary metasurface of claim 16, wherein the Airy beam includes a first ring center and a second ring center, and the amplitude distribution is generated by:
  generating a first amplitude distribution of an Airy beam having the first ring center;
  generating a second amplitude distribution of an Airy beam having the second ring center; and
  generating the amplitude distribution by superimposing the first amplitude distribution with the second amplitude distribution.

* * * * *